United States Patent
Stahl et al.

(10) Patent No.: US 9,086,089 B2
(45) Date of Patent: Jul. 21, 2015

(54) SCREWING DEVICE HAVING SEALING ELEMENTS

(71) Applicant: Airbus Operations GmbH, Hamburg (DE)

(72) Inventors: Gerd Stahl, Hamburg (DE); Frank Moeller, Hamburg (DE)

(73) Assignee: Airbus Operations GmbH (DE)

( * ) Notice: Subject to any disclaimer, the term of this patent is extended or adjusted under 35 U.S.C. 154(b) by 0 days.

(21) Appl. No.: 14/132,158

(22) Filed: Dec. 18, 2013

(65) Prior Publication Data

US 2014/0165370 A1 Jun. 19, 2014

Related U.S. Application Data

(60) Provisional application No. 61/738,477, filed on Dec. 18, 2012.

(30) Foreign Application Priority Data

Dec. 18, 2012 (DE) .......................... 10 2012 112 578

(51) Int. Cl.
*F16B 39/28* (2006.01)
*F16B 37/04* (2006.01)

(52) U.S. Cl.
CPC ................. *F16B 39/28* (2013.01); *F16B 37/04* (2013.01); *Y10T 29/49963* (2015.01); *Y10T 29/53* (2015.01)

(58) Field of Classification Search
CPC ......... F16B 39/28; F16B 37/04; Y10T 29/53; Y10T 29/49963
USPC ..................................................... 411/371.1
See application file for complete search history.

(56) References Cited

U.S. PATENT DOCUMENTS

| 2,462,023 | A | * | 2/1949 | Johanson et al. | 411/542 |
| 2,464,379 | A | * | 3/1949 | Courtot | 411/947 |
| 3,004,574 | A | * | 10/1961 | Flick et al. | 411/301 |

(Continued)

FOREIGN PATENT DOCUMENTS

| DE | 30 44 778 A1 | 6/1981 |
| DE | 36 40 626 A1 | 6/1988 |

(Continued)

OTHER PUBLICATIONS

Seal-Lock. Bollhoff Verbindungstechnik GmbH, 2011. URL: http://www2.boellhoff.com/web/cent <http://www2.boellhoff.com/web/cent>res.nsf/Files/SEAL-LOCK-D-0500/$File/SEAL-LOCK-D-0500.pdf [abgerufen am Aug. 23, 2013].

*Primary Examiner* — Gay Ann Spahn
(74) *Attorney, Agent, or Firm* — Lerner, David, Littenberg, Krumholz & Mentlik, LLP

(57) ABSTRACT

A screwing device includes a threaded hole that extends from an insertion opening to an end of the screwing device, which end is opposite the insertion opening. In the region of the insertion opening a first radial sealing element is arranged that by way of the insertion opening extends outwards in an axial direction of the hole. Spaced apart from the first sealing element in an axial direction of the hole a second radial sealing element is arranged in the screwing device with the internal diameter of the second radial sealing element being smaller than the external diameter of the threaded hole. In this manner a screwing device may be provided that is self-locking, exchangeable, and fluid-proof and that is suitable especially for vehicles and in particular for aircraft.

4 Claims, 5 Drawing Sheets

(56) References Cited

U.S. PATENT DOCUMENTS

| | | | |
|---|---|---|---|
| 3,325,196 A | 6/1967 | Noirot | |
| 3,550,498 A * | 12/1970 | Briles | 411/432 |
| 3,622,167 A * | 11/1971 | Velthoven | 277/640 |
| 4,132,145 A * | 1/1979 | Becker | 411/427 |
| 4,362,449 A | 12/1982 | Hlinsky | |
| 4,841,796 A * | 6/1989 | Teramachi | 411/432 |
| 4,875,817 A * | 10/1989 | Suzumura et al. | 411/429 |
| 4,934,856 A * | 6/1990 | Pauc | 411/542 |
| 4,960,342 A * | 10/1990 | Chi | 411/303 |
| 5,342,096 A * | 8/1994 | Bachle et al. | 411/542 |
| 5,393,182 A * | 2/1995 | Berecz | 411/369 |
| 5,730,540 A * | 3/1998 | Duran et al. | 411/112 |
| 5,860,779 A * | 1/1999 | Toosky et al. | 411/542 |
| 6,071,052 A * | 6/2000 | Kerr | 411/302 |
| 8,011,076 B2 * | 9/2011 | Beeles et al. | 29/243.529 |
| 2010/0251661 A1 * | 10/2010 | Illgner et al. | 411/383 |
| 2012/0177460 A1 * | 7/2012 | Flaig | 411/275 |

FOREIGN PATENT DOCUMENTS

| | | |
|---|---|---|
| DE | 202 10 703 U1 | 11/2003 |
| DE | 20 2011 109 319 U1 | 3/2013 |
| GB | 830 722 A | 3/1960 |

\* cited by examiner

SCREWING DEVICE HAVING SEALING ELEMENTS

CROSS-REFERENCE TO RELATED APPLICATIONS

This application claims the benefit of the filing date of U.S. Provisional Patent Application No. 61/738,477, filed Dec. 18, 2012, the disclosures of which application is herewith incorporated herein by reference.

TECHNICAL FIELD

The invention relates to a screwing device and to the use of screwing devices for a wing-fuselage connection of an aircraft.

BACKGROUND OF THE INVENTION

In the state of the art, screwing devices are used for a host of different applications and are highly diversified in an application-specific manner. In the manufacture and service/maintenance of vehicles, and in particular of aircraft, screwing devices are used which apart from the actual mechanical function in addition have to ensure that they do not automatically become undone as a result of vibration during operation of the vehicle. This is often ensured in that a cyanoacrylate-based adhesive is placed into the thread of a screw connection where it is cured. After a certain period of time of curing, the threads of the screwed-together element, which threads have been wetted with the adhesive, are bonded to one another, wherein any undoing of the screwing device becomes possible under the effect of an adequate undoing force.

Certain applications on aircraft, for example screwing together wings to a wing box, in addition to the locking function also require a sealing function in order to prevent any leakage, in particular of fuel, through the screw connections. To this effect, in the state of the art, for example, a so-called putty is used which after application on and into the screw connection also requires a certain curing time before further work may be undertaken in this location. If leakages occur, the removal of the screwing device and elaborate and expensive remedial work is necessary apart from the associated renewed curing time. As a result of the confined space available, the narrow access, and the very large number of screw connections, the application on a wing box in an aircraft is time-consuming.

BRIEF SUMMARY OF THE INVENTION

An aspect of the invention proposes a screwing device that provides as optimal a sealing function as possible while at the same time providing an optimal locking function, without having to resort to manual application of putty onto an adhesive-based screw-locking function or having to resort to a protracted curing time.

The screwing device according to an embodiment of the invention comprises a threaded hole that extends from an insertion opening to an end of the screwing device, which end is opposite the insertion opening, wherein in the region of the insertion opening a first radial sealing element is arranged that by way of the insertion opening extends outwards in an axial direction of the hole. Spaced apart from the first sealing element in an axial direction of the hole a second radial sealing element is arranged whose major diameter is smaller than the minor diameter of the threaded hole.

Arranging two spaced-apart sealing elements contributes to increasing the reliability of the sealing effect as a result of redundancy. As a result of the projection of the insertion opening with the first sealing element, during screwing together of the screwing device, when the insertion opening approaches the element to be screwed together, the first sealing element may be squeezed into the screwing device and against a through-reaching screw element. As a result of the squeezing action the first sealing element is pressed with substantial force against the screw element so that the material of the sealing element preferably fully fills-in several convolutions, thus reliably preventing a fluid from being able to pass through between the screwing device and the through-reaching screw element. In this arrangement the major diameter of the first sealing element could correspond to the major diameter of the threaded hole or could exceed the aforesaid so that it is easier to insert the screw element into the screwing device.

The choice of the major diameter of the second sealing element is particularly suited to clamp into place an inserted screw element so that automatic undoing is prevented. Preferably, the major diameter of the second sealing element corresponds to the minor diameter of the screw element or is slightly smaller than the aforesaid. As a result of a chamfer on the end of the screw element, which end is to be inserted, the second sealing element may be elongated during the screwing action in order to finally lie tightly against the screw element and to be squeezed into the thread. As a result of the squeezing action an additional sealing function arises. If the first sealing element is adequately dimensioned for providing a tight seal, the frictional force between the first sealing element and the screw element is also such that this materials pairing clearly acts against any automatic undoing of the screw connection.

The materials that may be considered for the first sealing element and the second sealing element are preferably permanently elastic, wherein in the corresponding selection it must be taken into account that the screwing device, in particular for applications in aircraft, needs to be able to withstand a very large temperature range. For example silicon, rubber or caoutchouc, polytetrafluoroethylene (PTFE), polyamide and similar materials suggest themselves.

In this manner the screwing device according to an embodiment of the invention may ensure both a sealing effect and an adequate mechanical self-locking effect without depending on a curable functional material. Consequently, apart from the weight, which is reduced because no putty is used anymore, in particular clear savings in time are achieved. The maintenance effort is reduced as a result of the re-usability of the screwing devices and because there are no longer any residues of curable materials on the screw element.

In an advantageous embodiment the screwing device comprises a supporting surface, in which the insertion opening is positioned, wherein the threaded hole in a region of the insertion opening widens towards the insertion opening. As a result of this widening an annular space arises between an imaginary continuation of the threaded hole beyond the insertion opening and the supporting surface, wherein the annular space is arranged on a through-reaching screw element. When the supporting surface approaches the contacting surface of the object to be screwed into place, the first sealing element will touch the aforesaid, and with continued screwing action will be folded and finally squeezed into the annular space. The annular space and thus the expansion must be dimensioned in such a manner that in a squeezed state the first sealing element may be substantially received without its material being destroyed. The sealing effect of the first sealing element may be decisively improved, when compared to separately designed known sealing discs that follow on in the axial direction from a threaded hole, by matching the height of the part of the first sealing element, which part projects from the screwing device, with the widening in the insertion opening.

In a further advantageous embodiment, in the region of the supporting surface the screwing device comprises a radially-outwards-extending collar on which at a radial distance from the first sealing element a third sealing element is arranged that extends in the axial direction of the hole away from the supporting surface. The third sealing element also establishes a sealing effect between the screwing device and the contacting surface. Consequently, the redundancy and thus the reliability of the sealing effect of the screwing device is still further improved.

In a further advantageous embodiment the supporting surface at least in some regions comprises projections that in the axial direction of the hole extend over the supporting surface. These projections may be produced by means of production processes involving stamping or machining. The projections are designed to at least in some regions remove or penetrate the undercoat of a contacting surface approaching the supporting surface so that an electrically conductive connection is provided, for potential equalization, between the screwing device and a body that receives the screwing device.

It is particularly preferred if the projections extend from 0.1 to 0.3 mm in the axial direction of the hole. This is sufficient to produce the desired effect.

In an advantageous embodiment the screwing device comprises a first screwing device element and a second screwing device element, wherein the first screwing device element comprises a bearing surface in whose region the first sealing element is arranged, wherein the second screwing device element comprises a receiving surface that is formed so as to correspond to the bearing surface of the first screwing device element, wherein the second screwing device element comprises a supporting surface. In this manner the function of a washer or of a position compensation device between the screwing device and the contacting surface of the object to be screwed into place may be implemented in cooperation with the characteristics of the invention. For supporting the sealing effect, the second screwing device element may comprise a third sealing element, radially of a through-hole, which may establish a seal from the outside to the through-hole. The first sealing element acts between the through-hole and the threaded hole of the first screwing device element.

Preferably, the bearing surface and the receiving surface are spherical in shape in order to achieve a positionally variable spherical joint-like, flush, support of the first screwing device element for secure screwing. In this arrangement the first screwing device element could comprise a convex underside that may be placed onto a concave receiving surface.

Moreover, it is advantageous if the supporting surface is spherical so that in particular with the application of a third sealing element no local force peaks arise as a result of one-sided pressing onto a contact surface. In this arrangement the supporting surface is preferably slightly concave. The resulting indentation results in the entire rim of the screwing device resting against the contacting surface.

The invention further comprises the use of previously-mentioned screwing devices for a wing-fuselage connection of an aircraft. In this manner the screw connection may be designed to be fluid-proof, easily changeable while nevertheless being vibration-resistant. Because putty and screw securing means are no longer used, significant savings in weight may be made despite the use in each case of two or three sealing elements.

BRIEF DESCRIPTION OF THE DRAWINGS

Further characteristics, advantages and application options of the present invention are disclosed in the following description of the exemplary embodiments and of the figures. All the described and/or illustrated characteristics per se and in any combination form the subject of the invention, even irrespective of their composition in the individual claims or their interrelationships. Furthermore, identical or similar components in the figures have the same reference characters.

DETAILED DESCRIPTION

Figure 1A:
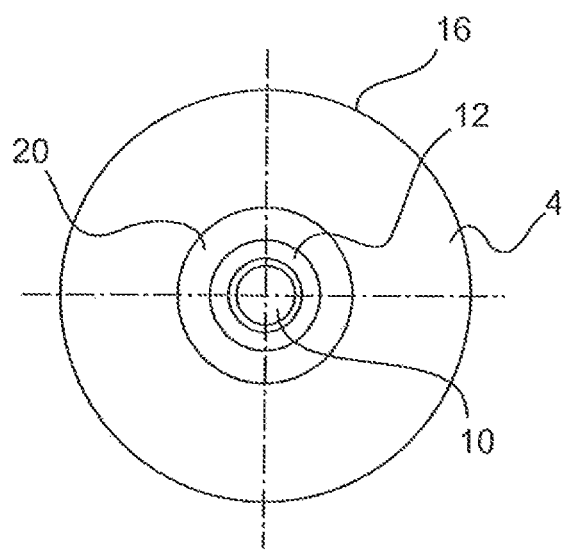
FIGS. 1a, 1b, 2a, 2b, 3a, 3b, 4a, and 4b in each case show a lateral section view and a top view of various single-part screwing devices.
Figure 1B:
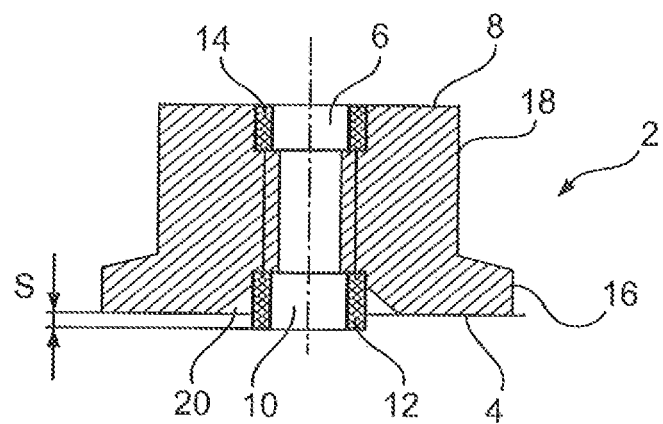

FIG. 1a-1b show a two-side illustration of a screwing device 2, with a top view of a supporting surface 4 and with a lateral section view. As an example the screwing device 2 comprises a annular supporting surface 4 from which a threaded hole 6 extends to an end surface 8 situated opposite the supporting surface 4. In the supporting surface 4 there is an insertion opening 10 through which a screw element (not shown) may be inserted into the threaded hole 6. In a region near the entry opening 10 there is a first radial sealing element 12, which in the state without a load is sleeve-shaped or ring shaped, wherein the major diameter of said sealing element 12 could approximately agree with the major diameter of the threaded hole 6 or could be somewhat exceed the aforesaid. FIGS. 1a-1b clearly show that the first sealing element 12 in an axial direction of the hole projects over the supporting surface 4 over a distance s. Consequently, the first sealing element 12 may fold together or squeeze together when the screwing device 2 is screwed on, thus conforming to a through-reaching screw element (not shown) that has been inserted.

In a region near the end surface 8 a second radial sealing element 14 is arranged that does not, or does not noticeably, project over the end surface 8. The major diameter of the second sealing element 14, which likewise is preferably designed to be sleeve-shaped or ring shaped, is particularly preferably smaller than the minor diameter of the threaded hole 6. The major diameter could, however, also be somewhat smaller than the major diameter of the threaded hole 6 in order to create a particularly permanent and reliable screw securing function, wherein the material of the second sealing element 14 must tolerate or allow this.

In order to achieve the largest possible supporting surface, the screwing device 2 comprises a projection 16 that is arranged in the manner of a collar around a base 18. This could be implemented in the form of a polygonal shape so that by applying a correspondingly shaped tool the screwing device 2 may be screwed onto a screw element. The supporting surface 4 is slightly concave and in particular slightly spherical in shape so that an indentation towards the base 18 results, which indentation prevents the occurrence of local force peaks as a result of uneven contact, in particular with curved surfaces.

In a region on the supporting surface 4 the entry opening 10 comprises a diameter that is larger than the internal diameter of the threaded hole 6. This means that in a region near the supporting surface 4 the threaded hole 6 widens towards the outside. The screwing device 2, when it is screwed onto a screw element (not shown), approaches a contacting surface. The supporting surface 4 at least circumferentially rests flush against the contacting surface, and as a result of the reducing space the first sealing element 12 is squeezed. Because of the screw element situated on the internal circumference of the screwing device 2 the first sealing element 12 cannot radially escape fully into the interior. Instead it is forced into a receiving space 20 that has arisen as a result of the taper or widening in the region of the supporting surface 4.

The receiving space 20 is to be dimensioned so that despite the resistance from the first sealing element the supporting surface 4 may rest completely on the contacting surface while nonetheless adequate pressure from the sealing element 12 is exerted on the screw element. In this process it is the object to squeeze the elastic first sealing element 12 into the convolutions of the screw element in such a manner that the space between the screwing device 2 and the screw element is completely fluid-proof.

Figure 2A:
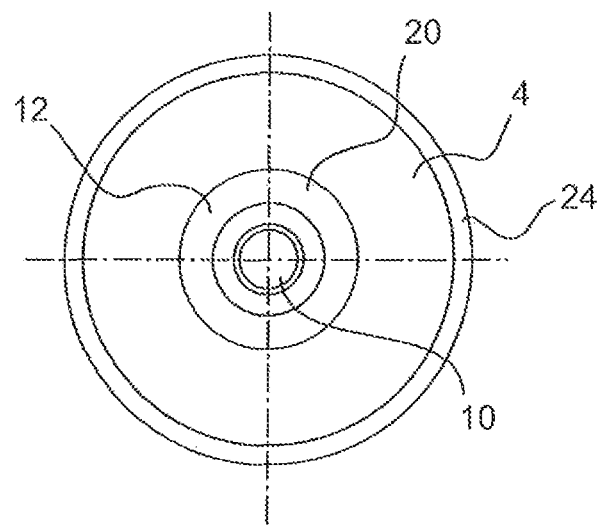
Figure 2B:
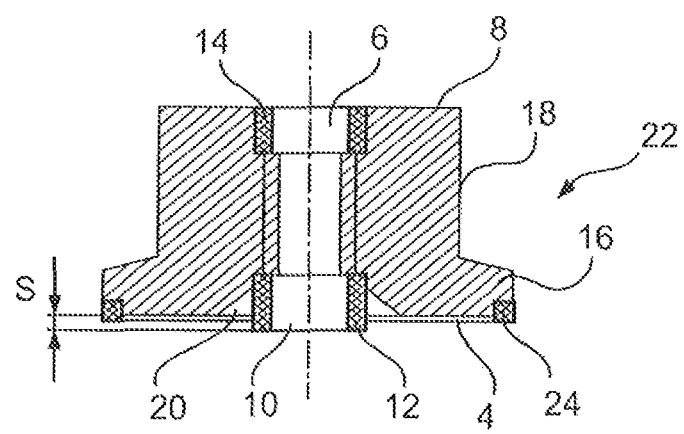

FIGS. 2a-2b show a screwing device 22 which essentially comprises all the characteristics of the screwing device 2 of FIGS. 1a-1b. In addition to this, on a radially outward rim of the supporting surface 4 a third ring-shaped sealing element 24 is arranged that from the supporting surface 4 slightly extends to the outside in an axial direction of the hole. If the screwing device 22 is screwed onto a screw element, the supporting surface 4 comes to rest so as to be flush on a contacting surface so that the third sealing element 24 also establishes tight contact, actuated by adherence, with the contacting surface. In this manner, further sealing surface pairing is established, which pairing supports the sealing effect of the first sealing element 12. In addition, the surface of the contacting surface is treated gently by the third sealing element 24.

Figure 3A:
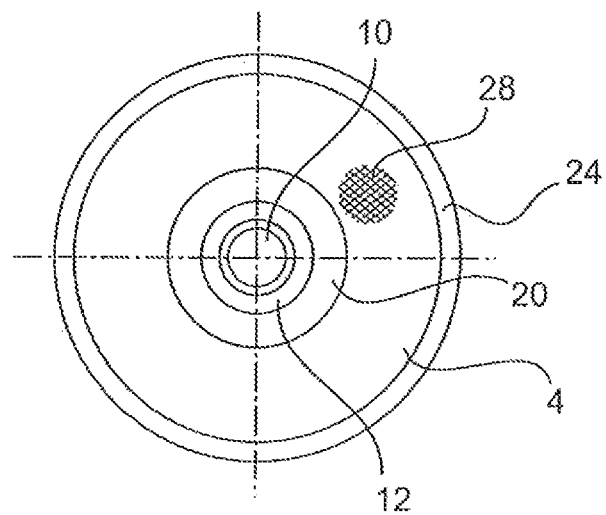
Figure 3B:
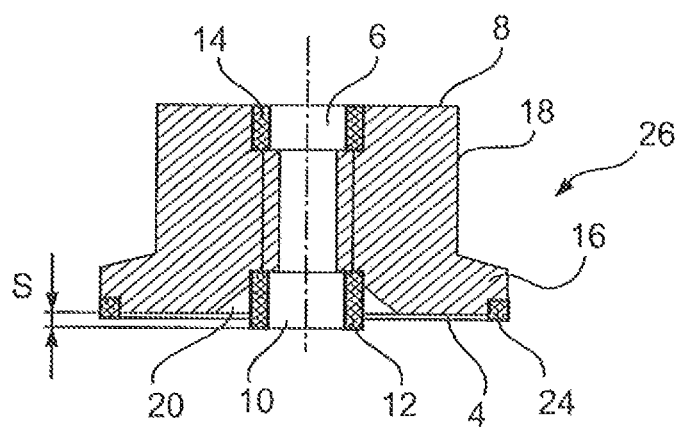

FIGS. 3a-3b show a modification of the screwing device 22 of FIGS. 2a-2b in the form of a screwing device 26. The latter, at its supporting surface 4 at least in some regions comprises a knurled structure 28 that when the screwing device 26 is screwed onto a screw element (not shown) is suitable for penetrating the base coat of a contacting surface at least in some regions, which contacting surface establishes contact with the supporting surface 4. In this manner for potential equalization an electrical contact may be established between the object onto which the screwing device 26 is being screwed and the screwing device 26 itself.

Figure 4A:
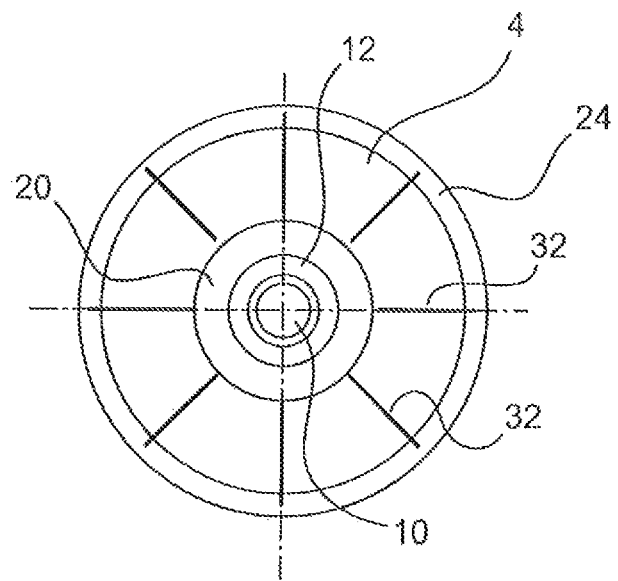
Figure 4B:
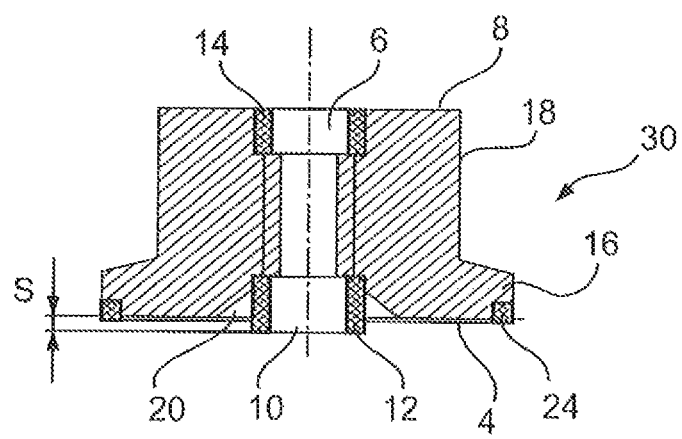

FIGS. 4a-4b show a further modification in the form of a screwing device 30 which at its supporting surface 4 comprises significantly larger and regularly formed projections 32 that are also suitable for removing a base coat. The projections 32 could extend around the threaded hole 6 in a star-shaped manner in the form of several webs.

Figure 5:
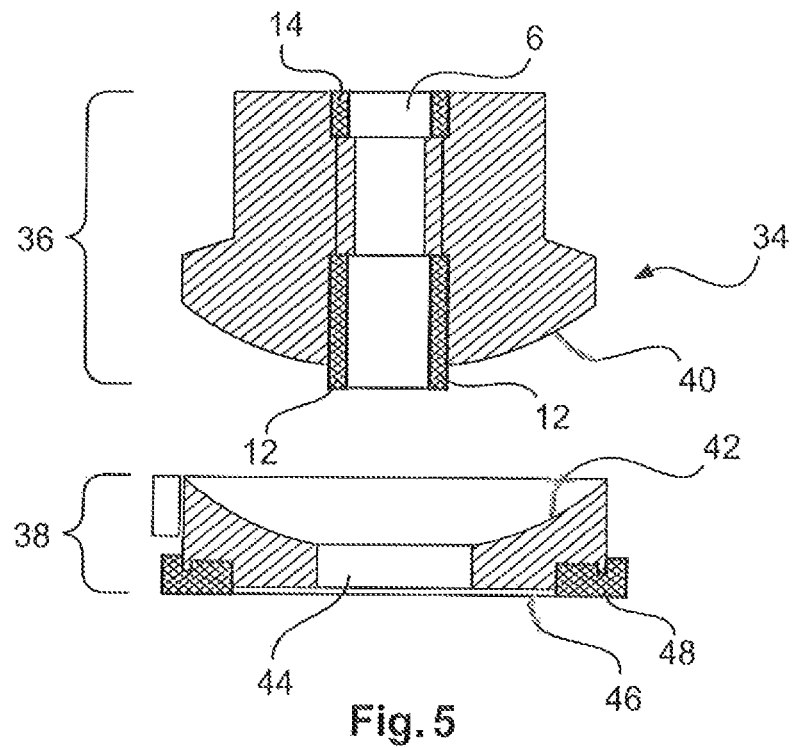
FIGS. 5 and 6 in each case show a lateral section view of two-part screwing devices.
Figure 6:
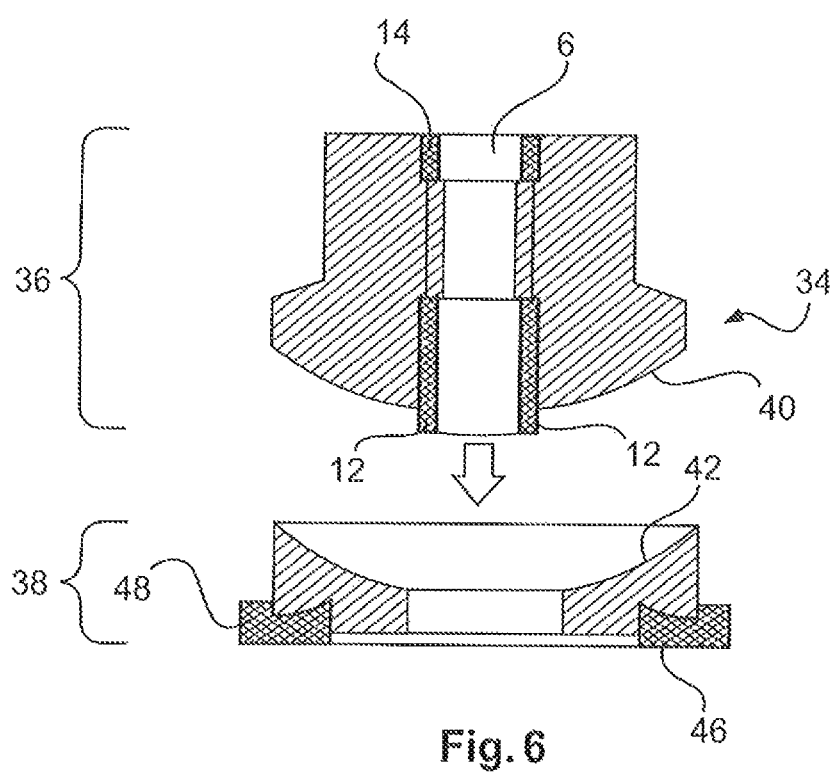

FIGS. 5 and 6 each show a two-part screwing device 34 that comprises a first screwing device component 36 and a second screwing device component 38. The first screwing device component 36 is similar to the screwing device 2 of FIGS. 1a-1b, wherein, however, instead of an only slightly concave supporting surface 4 there is a spherically more pronouncedly curved bearing surface 40 that is designed to correspond to a receiving surface 42 of the second screwing device component 38. The two screwing device components 36 and 38 may thus rest flush one against the other and may in the manner of a spherical joint allow the alignment of the threaded hole relative to a supporting surface 46 of the second screwing device component 36.

The first screwing device element 36 bears the first sealing element 12, which may be inserted through a through-hole 44 of the second screwing device element 38. When screwing together the screwing device 34, the first sealing element 12 will squeeze against the through-hole 44 and the through-reaching screw element (not shown). As a result of this a fluid-proof connection is established.

In a manner similar to that shown in FIGS. 2a to 4b, a third sealing element 24 is arranged radially outwards on the second screwing device element 38 and projects over the supporting surface 46 in the axial direction of the hole. In this manner the second screwing device element 38 on the one hand is affixed, so as to be frictionally engaged, on the contacting surface, and on the other hand already as a result of this materials pairing carries out a sealing function. FIGS. 5 and 6 show slightly different embodiments of the third radial sealing element 48 that may either be approximately U-shaped (FIG. 5) or may comprise a curved contour. The selection of the shape of the third sealing element 48 is relatively discretionary as long as it may be ensured that as far as possible the third sealing element 48 does not come off the second screwing device component 38 when not in use.

In addition, it should be pointed out that "comprising" does not exclude other elements or steps, and "a" or "one" does not exclude a plural number. Furthermore, it should be pointed out that characteristics or steps which have been described with reference to one of the above exemplary embodiments may also be used in combination with other characteristics or steps of other exemplary embodiments described above. Reference characters in the claims are not to be interpreted as limitations.

The invention claimed is:

1. A screwing device comprising:
   a base having a supporting surface at a first end and an end surface at a second end opposite to the first end,
   an insertion opening defined at the supporting surface,
   a threaded hole in the base extending from the insertion opening to the end surface and having a first internal diameter within the base, the threaded hole configured to receive therewithin a screw element;
   a first radial sealing element arranged in the region of the insertion opening and extending outwards in an axial direction of the hole away from the supporting surface; and
   a second radial sealing element arranged in the screwing device spaced apart from the first sealing device,
   wherein the threaded hole in a region of the insertion opening has, at the supporting surface, a second internal diameter greater than the first internal diameter within the base such that a receiving space is defined between the first radial sealing element and an internal surface of the insertion opening.

2. The screwing device of claim 1, in the region of the supporting surface further comprising a radially-outwards-extending collar, on which at a radial distance from the first sealing element a third sealing element is arranged that extends in the axial direction of the hole away from the supporting surface.

3. The screwing device of claim 1, wherein the supporting surface at least in some regions further comprises projections that in the axial direction of the hole extend over the supporting surface.

4. The screwing device of claim 3, wherein the projections extend from 0.1 to 0.3 mm in the axial direction of the hole.

* * * * *